US009807089B2

(12) United States Patent
Chiang et al.

(10) Patent No.: US 9,807,089 B2
(45) Date of Patent: Oct. 31, 2017

(54) BIOMETRICS DATA RECOGNITION APPARATUS, METHOD AND NON-TRANSITORY TANGIBLE COMPUTER READABLE MEDIUM

(71) Applicant: Egis Technology Inc., Taipei (TW)

(72) Inventors: Yuan-Lin Chiang, Taipei (TW); Jun-Chao Lu, Taipei (TW)

(73) Assignee: EGIS TECHNOLOGY INC., Taipei (TW)

( * ) Notice: Subject to any disclaimer, the term of this patent is extended or adjusted under 35 U.S.C. 154(b) by 804 days.

(21) Appl. No.: 14/249,816

(22) Filed: Apr. 10, 2014

(65) Prior Publication Data

US 2015/0163219 A1 Jun. 11, 2015

(30) Foreign Application Priority Data

Dec. 6, 2013 (TW) .............................. 102144874 A (51) Int. Cl.
*H04L 29/06* (2006.01)
*G07F 17/32* (2006.01)

(52) U.S. Cl.
CPC .... *H04L 63/0861* (2013.01); *H04L 29/06809* (2013.01); *G07F 17/3206* (2013.01)

(58) Field of Classification Search
CPC .......... H04L 63/0861; H04L 29/06809; G06K 9/00892
See application file for complete search history.

(56) References Cited

U.S. PATENT DOCUMENTS

2013/0314208 A1* 11/2013 Risheq ............... G07C 9/00158
340/5.53
2013/0318576 A1 11/2013 Prakash et al.
2014/0342818 A1* 11/2014 Smith .................. A63F 13/424
463/29

FOREIGN PATENT DOCUMENTS

CN 102495855 A 6/2012
TW 201339886 A 10/2013

* cited by examiner

*Primary Examiner* — Arvin Eskandarnia
(74) *Attorney, Agent, or Firm* — Muncy, Geissler, Olds & Lowe, P.C.

(57) ABSTRACT

A biometrics data recognition apparatus includes a computer device and a biometrics data recognition device, which includes a biometrics data sensor, a control processor and a storage. The biometrics data sensor captures to-be-recognized biometrics data of an organism. The storage stores template biometrics data and website login data corresponding to each other. The control processor receives and judges whether the to-be-recognized biometrics data matches with the template biometrics data and outputs the website login data to the computer device if a match occurs. The computer device communicates with a cloud server and extracts login format data from the cloud server according to the website login data, and combines the website login data with the login format data to make the computer device log in a website corresponding to the website login data. A biometrics data recognition method and a non-transitory tangible computer readable medium are also disclosed.

14 Claims, 4 Drawing Sheets

BIOMETRICS DATA RECOGNITION APPARATUS, METHOD AND NON-TRANSITORY TANGIBLE COMPUTER READABLE MEDIUM

This application claims priority of No. 102144874 filed in Taiwan R.O.C. on Dec. 6, 2013 under 35 USC 119, the entire content of which is hereby incorporated by reference.

BACKGROUND OF THE INVENTION

Field of the Invention

The invention relates to a biometrics data recognition apparatus, a biometrics data recognition system, a biometrics data recognition method and a non-transitory tangible computer readable medium storing a biometrics data recognition application program, and more particularly to the biometrics data recognition apparatus, method and non-transitory tangible computer readable medium storing an application program, which can automatically log in a website by way of biometrics data recognition.

Related Art

At present, a user can log in a website by inputting an account and a password, so the user has to remember accounts and passwords for various websites, and to log in the website by way of manually inputting. Although some application programs allow the user to perform the login operation by inputting biometrics characteristic data (e.g., fingerprint), these application programs are configured to have fingerprint recognition interfaces, through which the users are allowed to perform the previous register operations and subsequent recognition operations. In addition, these application programs only can enable specific application functions, and cannot log in the ordinary website where the user wants to log in. If the user wants to log in each website, a website-specific application program has to be provided to provide a fingerprint recognition interface, and this brings inconvenience to the user.

Even if some application programs can log in specific websites by way of fingerprint recognition, the user must update the application program to perform the login operation on the specific website when the login format of each of the websites is changed, and this also brings inconvenience to the user. Alternatively, when the user uses another computer, in which no specific application program is installed, the login or register operation also cannot be performed.

SUMMARY OF THE INVENTION

It is therefore an object of the invention to provide a biometrics data recognition apparatus, method and non-transitory tangible computer readable medium storing an application program, which can automatically log in a website by way of biometrics data recognition. Even if the login method of the website is updated, the biometrics data recognition apparatus and system still can work normally to allow the user to log in the desired website by way of biometrics identification.

To achieve the above-identified object, the invention provides a biometrics data recognition apparatus including a biometrics data recognition device and a computer device. The biometrics data recognition device includes a biometrics data sensor, a control processor and a storage. The biometrics data sensor captures to-be-recognized biometrics data of an organism. The control processor is electrically connected to the biometrics data sensor. The storage is electrically connected to the control processor and stores template biometrics data and website login data corresponding to each other. The control processor receives and judges whether the to-be-recognized biometrics data matches with the template biometrics data. If yes, the control processor admits a verification pass and outputs the website login data to the computer device. The computer device communicates with a cloud server, extracts login format data from the cloud server according to the website login data, and combines the website login data with the login format data to make the computer device log in one or multiple websites corresponding to the website login data.

The invention also provides a biometrics data recognition method including the steps of: utilizing a biometrics data sensor to capture to-be-recognized biometrics data of an organism; utilizing a control processor to receive and judge whether the to-be-recognized biometrics data matches with template biometrics data stored in a storage, wherein if yes, the control processor admits a verification pass and outputs corresponding website login data, stored in the storage, to a computer device; utilizing the computer device to communicate with a cloud server and extract login format data from the cloud server according to the website login data; and combining the website login data with the login format data to make the computer device log in one or multiple websites corresponding to the website login data.

The invention further provides a non-transitory tangible computer readable medium storing a biometrics data recognition application program capable of executing a biometrics data recognition method comprising the steps of: utilizing a biometrics data sensor of a biometrics data recognition device to capture to-be-recognized biometrics data of an organism; utilizing a control processor of the biometrics data recognition device to receive and judge whether the to-be-recognized biometrics data matches with template biometrics data, stored in a storage of the biometrics data recognition device, wherein if the to-be-recognized biometrics data matches with the template biometrics data, the control processor admits a verification pass and outputs corresponding website login data, stored in the storage, to a computer device; utilizing the computer device to communicate with a cloud server and extract login format data from the cloud server according to the website login data; and combining the website login data with the login format data to make the computer device log in one or multiple websites corresponding to the website login data.

According to the above-mentioned biometrics data recognition apparatus, and method, the user can utilize the biometrics data recognition device to perform the biometrics data recognition. After the verification pass is admitted, the account data and the password data are transferred to the computer device, which requests the login format data of the cloud server to make the computer device automatically log in the desired website, so that the convenience in use is enhanced.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Each embodiment of the invention utilizes a biometrics data recognition device to perform the biometrics data recognition, admit a verification pass, and then transfer the data of an account and a password to the computer device. In addition, the computer device also requests login format data on the cloud server and thus makes the computer device automatically log in the desired website where the user wants to log in, thereby enhancing the convenience in use.

Figure 1:
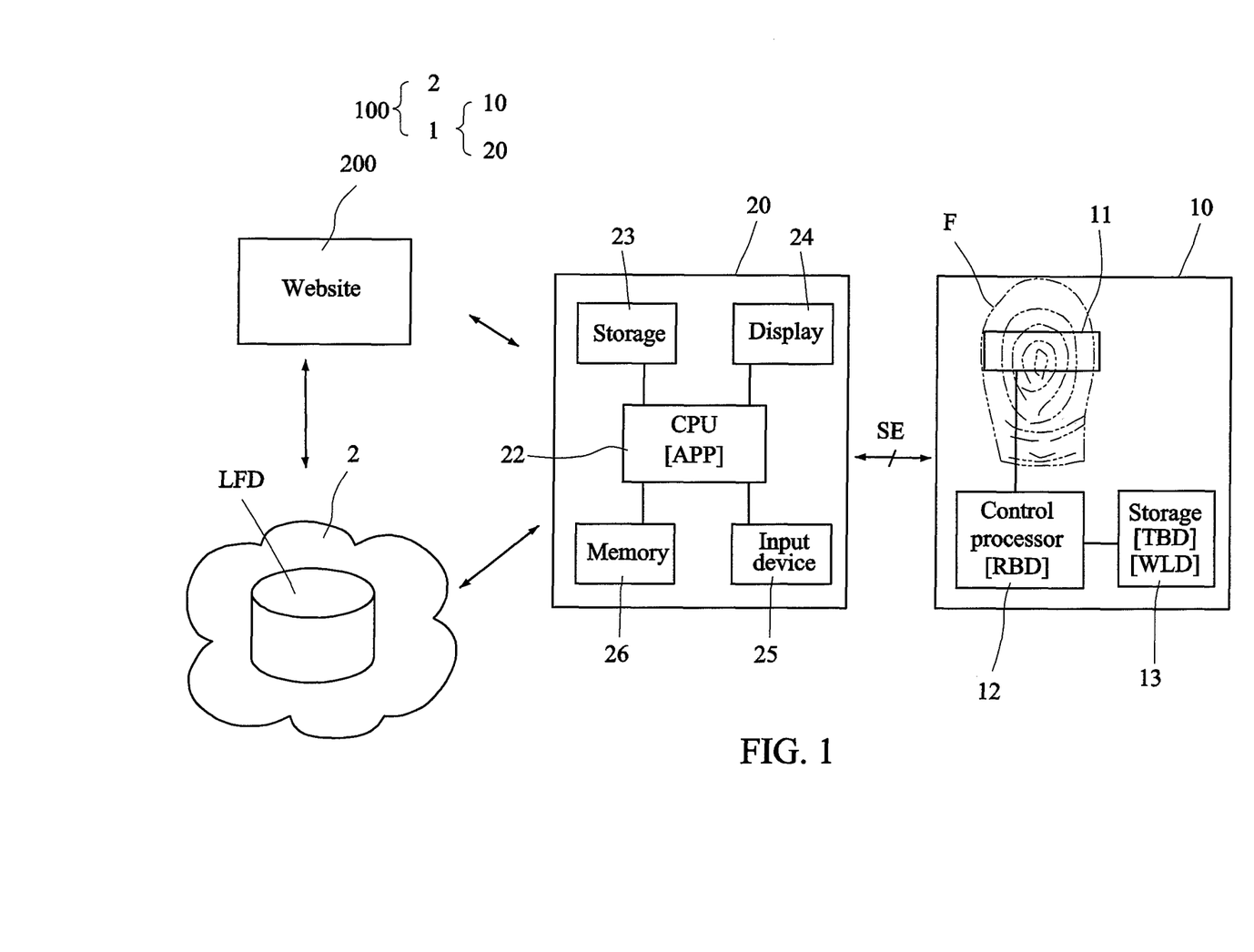
FIG. 1 is a schematic view showing a biometrics data recognition system according to a first embodiment of the invention.

FIG. 1 is a schematic view showing a biometrics data recognition system 100 according to a first embodiment of the invention. Referring to FIG. 1, the biometrics data recognition system 100 of this embodiment includes a cloud server 2 and a biometrics data recognition apparatus 1. The cloud server 2 is a server on the Intranet, and may be provided by the manufacturer of the biometrics data recognition apparatus 1 in one example, and provided by an Intranet service provider in another example.

The biometrics data recognition apparatus 1 is connected to the cloud server 2 through, for example but without limitation to, a wired network, a wireless network or other types of networks. In this embodiment, the biometrics data recognition apparatus 1 includes a biometrics data recognition device 10 and a computer device 20.

The biometrics data recognition device 10 includes a biometrics data sensor 11, a control processor 12 and a storage 13. The biometrics data sensor 11 captures to-be-recognized biometrics data RBD of an organism F. In this embodiment, a finger serves as one example of the organism F, and the fingerprint serves as one example of the to-be-recognized biometrics data RBD. However, the invention is not particularly restricted thereto, and other biometrics characteristic data, such as the palmprint, face, eye iris, and the like, may also serve as other examples of the biometrics data. The control processor 12 is electrically connected to the biometrics data sensor 11 and receives the to-be-recognized biometrics data RBD. The storage 13 is electrically connected to the control processor 12, and stores template biometrics data TBD and website login data WLD corresponding to each other.

In this embodiment, the biometrics data recognition device 10 and the computer device 20 are devices independent from each other. The computer device 20 includes, for example but without limitation to, a desktop computer, a notebook computer, a mobile phone (including smart mobile phone), a tablet computer or the like. Therefore, the computer device 20 includes a central processing unit (CPU) 22, and a storage 23, a display 24, an input device (e.g., a keyboard, a mouse or a touch panel) 25 and a memory 26 electrically connected to the CPU 22.

The control processor 12 receives and judges whether the to-be-recognized biometrics data RBD matches with the template biometrics data TBD by way of minutia point matching, graphic matching, frame characteristic matching or the like. If the to-be-recognized biometrics data RBD matches with the template biometrics data TBD, then the control processor 12 admits a verification pass and outputs the website login data WLD to the computer device 20. Thus, the website login data WLD is always stores in the biometrics data recognition device 10, and is transferred to the computer device 20 after the recognition passes, so that the user can automatically log in the website without pressing any confirmation key or button. In one example, after the user leaves or logs out the website, the computer device 20 deletes the website login data WLD.

The computer device 20 communicates with the cloud server 2, extracts login format data LFD from the cloud server 2 according to the website login data WLD, and combines the website login data WLD with the login format data LFD to make the computer device 20 log in one or multiple websites 200 corresponding to the website login data WLD after admitting the verification pass. It is to be noted that the timing of extracting the login format data LFD from the cloud server 2 may be before or after the website login data WLD is obtained. In addition, the extracted login format data LFD may be stored in the computer device 20 for cache.

With the biometrics data recognition apparatus 1, the user can utilize the biometrics data recognition device 10 to perform the website login operation. Of course, the user can create the website login data WLD and the template biometrics data TBD by way of initial setting or setting value importing.

In the practical application, the biometrics data recognition device 10 may serve as an active device or a passive device. In order to make the biometrics data recognition device 10 become the active device, the control processor 12 of the biometrics data recognition device 10 may be configured to further output an enable signal SE to the computer device 20 to execute an application program APP stored in a non-transitory tangible computer readable medium of the computer device 20 after the verification pass is admitted. Thus, the computer device 20 can utilize the application program APP to automatically log in one or multiple websites 200. That is, the user only needs to turn on the biometrics data recognition device 10 to make the computer device 20 automatically perform the website login operation. Therefore, the biometrics data recognition device 10 serves as an active key, which can unlock the doors to the set websites. In another example, the biometrics data recognition device 10 may output a wake-up signal to the computer device 20, so that the user can wake up the computer device 20 and make the computer device 20 automatically open the desired website without pressing the button of the computer device 20.

In order to satisfy the user's requirement, the control processor 12 may query the user whether he or she wants to log in one or multiple websites 200 before the control processor 12 logs in the corresponding one or multiple websites 200. This can prevent the user from logging in the website, which has been previously set by the user who does not want to log in the website. In the practical application, the websites can be confirmed one by one, or check boxes corresponding to the websites can be provided and checked by the user.

The biometrics data recognition device 10 may be connected to the computer device 20 through a wired connection medium or a wireless connection mechanism (e.g., the bluetooth communication protocol, wireless network, or the like).

Table 1 shows an example of the website login data WLD. In Table 1, the website login data WLD includes a website code, an account name and a password. The user can set three sets of website login data in advance so that he or she can log in the three websites to perform the personal access works after the verification pass is admitted. It is to be noted that the website code 001 in Table 1 represents https://www.youtube.com/, the website code 002 represents https://mail.google.com/, and the website code 003 represents http://www.ruten.com.tw/. However, the invention is not particularly restricted thereto, and the website code may also include the website address.

TABLE 1

| Website Code | Website Address | Account Name | Password |
| --- | --- | --- | --- |
| 001 | https://www.youtube.com/ | user856 | pad5632pod |
| 002 | https://mail.google.com/ | 632frank | pad8696 |
| 003 | http://www.ruten.com.tw/ | john8965 | jorge123 |

Table 2 lists an example of website login data WLD and template biometrics data TBD. In Table 2, the template biometrics data TBD corresponds to the biometrics data of multiple users, the website login data WLD includes multiple website codes, multiple account names and multiple passwords corresponding to the biometrics data of the multiple users. The template data and the website login data WLD of different users are stored in the storage 13 in advance. Thus, different users can log in the same website through the biometrics identification. Of course, in another example, different users can log in different websites through the biometrics identification.

TABLE 2

| User | Website Code/Website Address | Account Name | Password | Template Biometrics Data |
| --- | --- | --- | --- | --- |
| 1 | https://www.youtube.com/ | user856 | pad5632pod | AAAA |
| 2 | https://www.youtube.com/ | 632frank | pad8696 | BBBBB |
| 3 | https://www.youtube.com/ | john8965 | jorge123 | CCCCC |

Table 3 lists another example of the website login data WLD and the template biometrics data TBD. In Table 3, the template biometrics data TBD corresponds to the biometrics data of different portions of a single user, and the website login data WLD includes multiple website codes, multiple account names and multiple passwords corresponding to the biometrics data of different portions of the user. The template data of different fingers of the user and the website login data WLD are stored in the storage 13 in advance. Thus, the user can log in different websites through the biometrics identification of different fingers.

TABLE 3

| User | Website Code/Website Address | Account Name | Password | Template Biometrics Data |
| --- | --- | --- | --- | --- |
| 1 | https://www.youtube.com/ | user856 | pad5632pod | thumb |
| 2 | https://mail.google.com/ | 632frank | pad8696 | index finger |
| 3 | http://www.ruten.com.tw/ | john8965 | jorge123 | middle finger |

In order to get the newest status of the login format data LFD of each website, the cloud server 2 has scripts for updating the login format data LFD of each website dynamically or at any time, so that the user can log in the desired website to perform transaction, content browsing, E-mail sending and receiving, or message sending and receiving at any time.

In this embodiment, the cloud server 2 only updates the login format data LFD, and the update timing is decided by the cloud server 2. Upon implementation, the cloud server 2 executes a test program to continuously log in a website 200 using the login format data LFD. If the website cannot be logged in successfully, whether the login format data is changed may be analyzed by another program or artificially so that the new login format can be obtained. The CPU 22 of the computer device 20 timely communicates with the cloud server 2 to determine whether the login format data LFD is updated, and actively downloads the updated portion of the login format data LFD if the login format data LFD is updated. On the other hand, the cloud server 2 may perform an operation of updating the login format data LFD on the computer device 20. Thus, as long as the login format data LFD is updated, the cloud server 2 immediately requests the computer device 20 to download the new login format data LFD. Of course, this operation needs to be confirmed by the computer device 20 actively. In other examples of the invention, the computer device 20 would not store the website login data WLD. That is, the website login data WLD is immediately deleted after the program of the computer device 20 ends to prevent the website login data WLD from being stolen.

Figure 2:
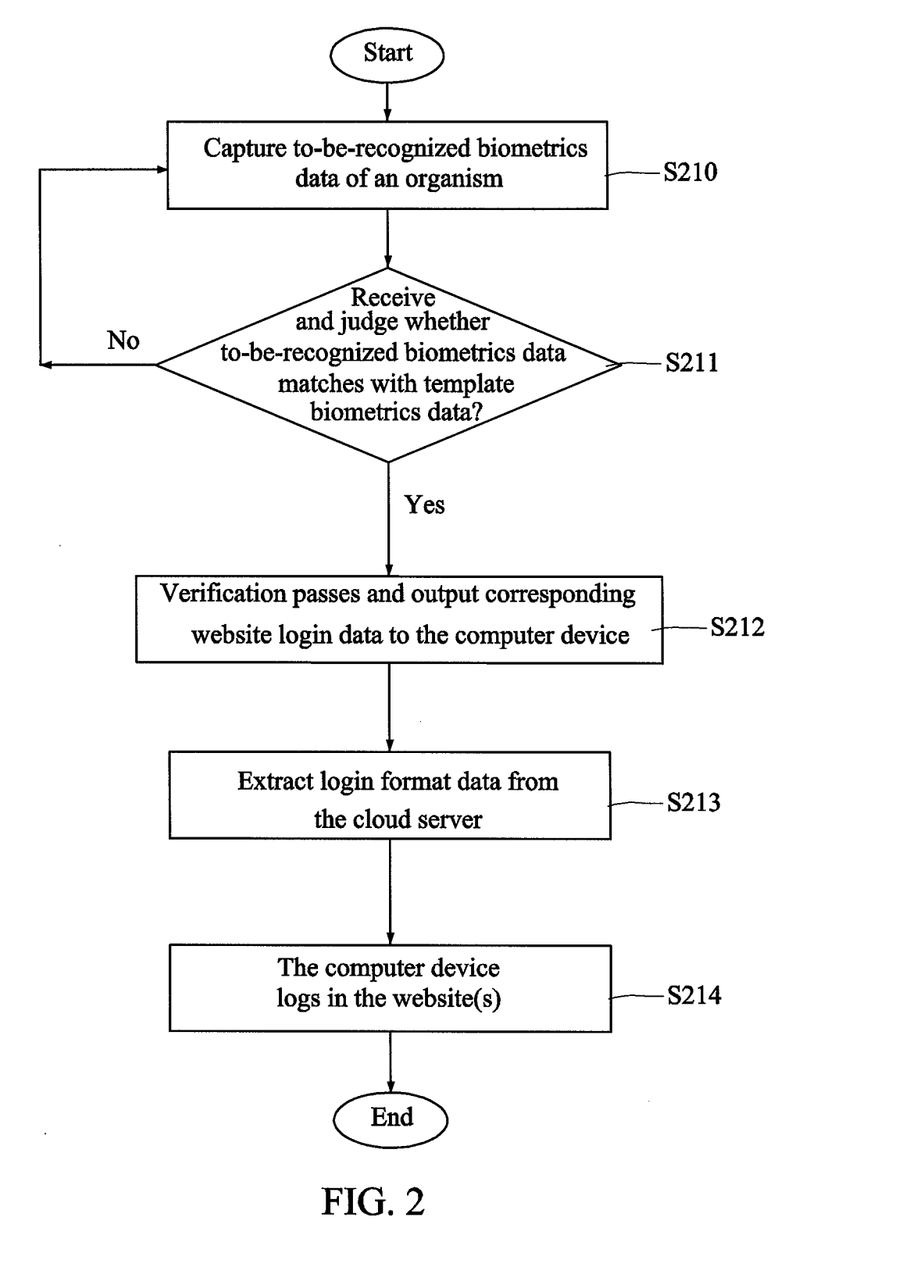
FIG. 2 is a schematic view showing a biometrics data recognition method according to the first embodiment of the invention.

FIG. 2 is a schematic view showing a biometrics data recognition method according to the first embodiment of the invention. As shown in FIGS. 1 and 2, the biometrics data recognition method of this embodiment includes the following steps.

First, in step S210, the biometrics data sensor 11 is utilized to capture the to-be-recognized biometrics data RBD of the organism F. Next, in step S211, the control processor 12 is utilized to receive and judge whether the to-be-recognized biometrics data RBD matches with the template biometrics data TBD of the storage 13. If not, the procedure returns to the step S210. If yes, step S212 is performed to admit a verification pass and outputs the corresponding website login data WLD, stored in the storage 13, to the computer device 20.

Next, in step S213, the computer device 20 is utilized to communicate with the cloud server 2 and extract the login format data LFD from the cloud server 2 according to the website login data WLD. Then, in step S214, the website login data WLD and the login format data LFD are combined together to make the computer device 20 log in one or multiple websites 200 corresponding to the website login data WLD. It is to be noted that the biometrics data recognition method of this embodiment can perform various operations described with reference to FIG. 1, and detailed descriptions thereof will be omitted. In addition, the invention also provides a biometrics data recognition application program for performing the above-mentioned biometrics data recognition method.

Figure 3:
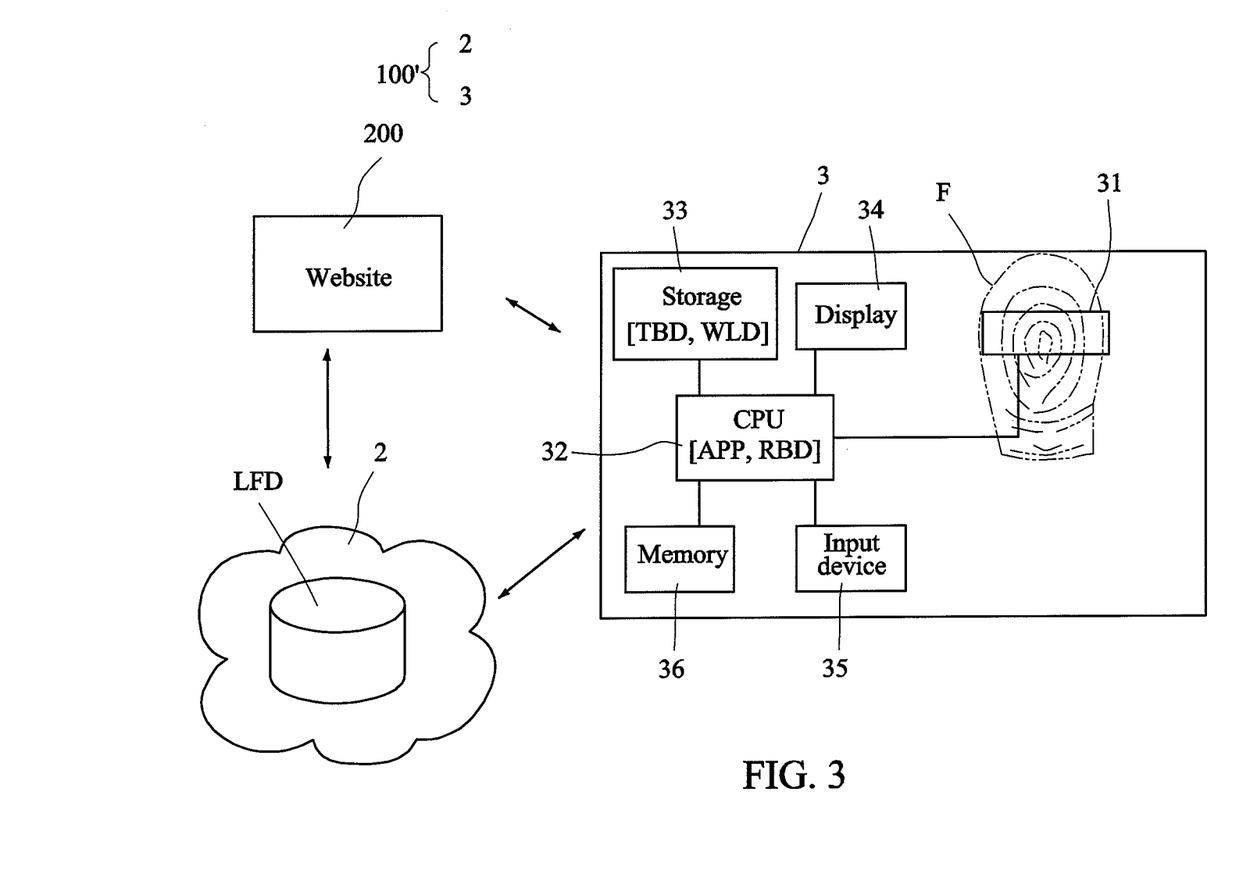
FIG. 3 is a schematic view showing a biometrics data recognition system according to a second embodiment of the invention.

FIG. 3 is a schematic view showing a biometrics data recognition system 100' according to a second embodiment of the invention. As shown in FIG. 3, this embodiment is similar to the first embodiment except for the difference that the biometrics data recognition system 100' has the biometrics data recognition device 10 of the first embodiment and the computer device 20 integrated into one biometrics data recognition apparatus 3, which may be a desktop computer, a notebook computer, a mobile phone (smart mobile phone) or a tablet computer having the biometrics data sensor.

Thus, the biometrics data recognition system 100' of this embodiment includes the cloud server 2 and the biometrics data recognition apparatus 3. The biometrics data recognition apparatus 3 is connected to the cloud server 2 and includes a biometrics data sensor 31, a CPU 32 and a storage 33. In addition, the biometrics data recognition apparatus 3 may further include a display 34 for displaying information, and a memory 36 for temporarily storing data. The biometrics data sensor 31, the storage 33, the display 34 and the memory 36 are electrically connected to the CPU 32.

The biometrics data sensor 31 captures the to-be-recognized biometrics data RBD of the organism F. The CPU 32 is electrically connected to the biometrics data sensor 31. The storage 33 is electrically connected to the CPU 32, and stores the template biometrics data TBD and the website login data WLD corresponding to each other. The CPU 32 receives and judges whether the to-be-recognized biometrics data RBD matches with the template biometrics data TBD. If yes, the CPU 32 admits a verification pass, communicates with the cloud server 2, extracts the login format data LFD from the cloud server 2 according to the website login data WLD, and combines the website login data WLD with the login format data LFD to make the biometrics data recognition apparatus 3 log in one or multiple websites 200 corresponding to the website login data WLD.

It is to be noted that the website login data WLD may be backuped to the user's personal network storage space, such as Dropbox, which is different from the website 200 to be logged in. For example, when the user operates the biometrics data recognition apparatus 3 or the computer device 20, the application program prompts several frequently used network storage spaces to the user. The user may pick up the storage space or spaces, and input the password or passwords. In the future, the user's application program can actively backup the login data to the network storage space or spaces. Thus, the periodically backup and update effects can be obtained without worrying about the loss caused by the lost biometrics data recognition apparatus 3 or the lost biometrics data recognition device 10.

Figure 4:
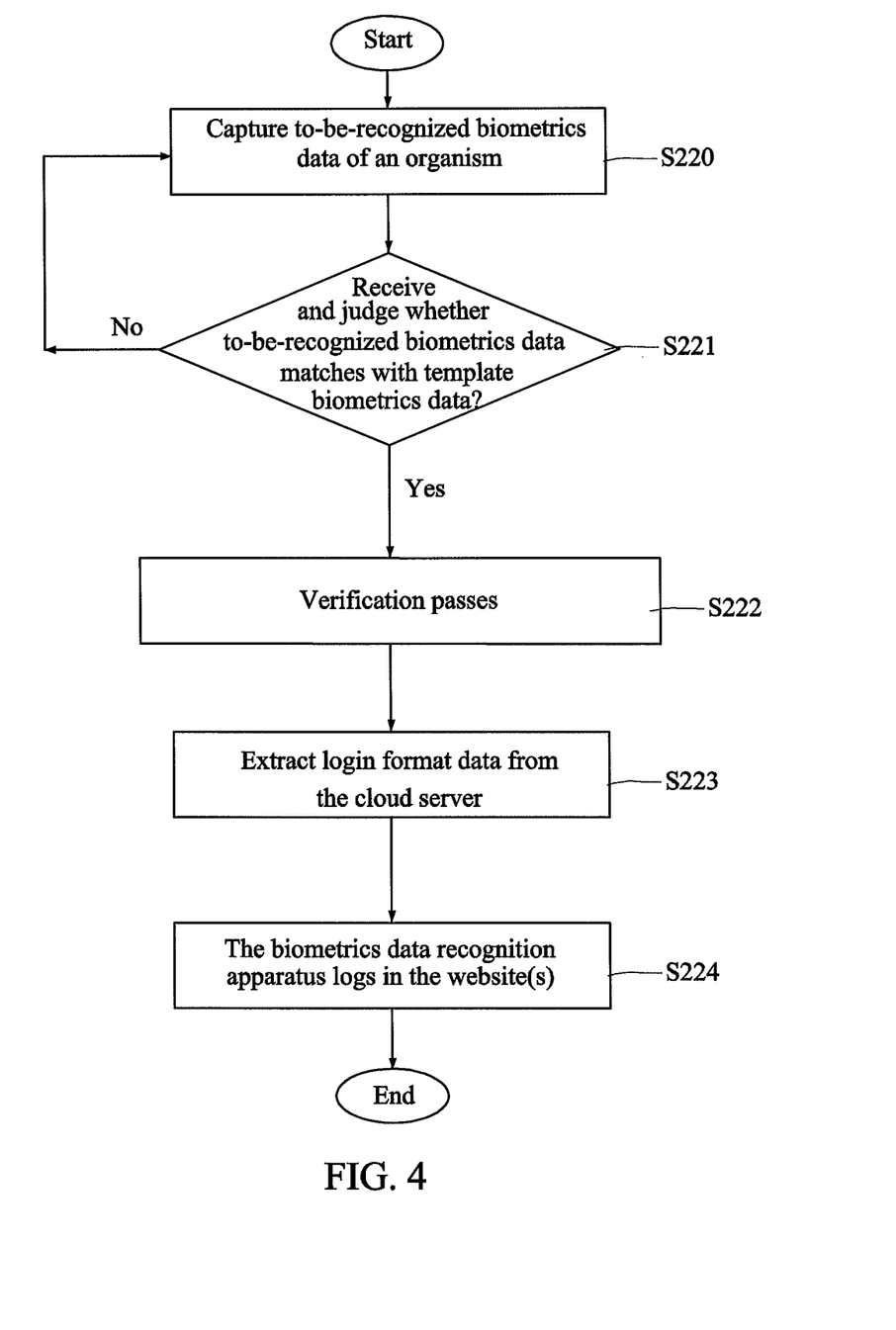
FIG. 4 is a schematic view showing a biometrics data recognition method according to the second embodiment of the invention.

FIG. 4 is a schematic view showing a biometrics data recognition method according to the second embodiment of the invention. Referring to FIGS. 3 and 4, the biometrics data recognition method of this embodiment includes the following steps. First, in step S220, the biometrics data sensor 31 is utilized to capture the to-be-recognized biometrics data RBD of the organism F. Then, in step S221, the CPU 32 is utilized to receive and judge whether the to-be- recognized biometrics data RBD matches with the template biometrics data TBD stored in the storage 33. If not, the procedure returns to the step S220. If yes, the procedure enters step S222, which represents the admitting of the verification pass. Then, as shown in step S223, the CPU 32 communicates with the cloud server 2, and extracts the login format data LFD from the cloud server 2 according to the corresponding website login data WLD stored in the storage 13. Next, as shown in step S224, the website login data WLD is combined with the login format data LFD to make the biometrics data recognition apparatus 3 having the CPU 32 log in one or multiple websites 200 corresponding to the website login data WLD.

In addition, the invention also provides a biometrics data recognition application program for executing the above-mentioned biometrics data recognition method. In the following, two scripts will be described as examples.

First Example

```
-<web title="Facebook" ver="0" guid="0"
  url="https://www.facebook.com/">
  -<form id="login_form">
    <text id="email" name="email"/>
    <password id="pass" name="pass"/>
    <checkbox id="persist_box" value="FALSE"/>
    <submit id="u_0_?" value="click"/>
  </form>
</web>
```

Because those skilled in the art may easily understand the contents of the invention with reference to the above-mentioned program syntax, only the simple descriptions are given hereinbelow.
(a) title: represents the website.
(b) ver: represents the version, wherein if the number is increased to, for example, "1", then it represents that the update is needed.
(c) url: represents the login address of the website.
(d) form id="login_form" name=" ": represents that the login webpage has a form element, the element id="login_form", so the application program can utilize "login_form" to find the form element.
(e) The form element has four elements associated with login:
(i) text id="email" name="email": represents the element of the text found by id="email" or name="email", and the account data is stored in the element.
(ii) password id="pass" name="pass": represents the element of the password found using id="pass" or name="pass", and the password data is stored to the element.
(iii) checkbox id="persist_box" value="FALSE": represents the element of the checkbox found using id="persist_box", and FALSE represents uncheck the element.
(iv) submit id="u_0_?" value="click": represents the elements of login found using id="u_0_?", and that the login is performed by click.

Second Example

```
-<web    title="Google    Accounts"    ver="0"    guid="1"
  url="https://accounts.google.com/
```

-continued

```
    ServiceLogin?hl={LCID}&continue=https://
    www.google.com">
-<form id="gaia_loginform">
<email id="Email" name="Email"/>
<password id="Passwd" name="Passwd"/>
<checkbox       id="PersistentCookie"
name="PersistentCookie"
value="FALSE"/>
<submit id="signIn" name="signIn"/>
</form>
-<LCID>
<zh-TW title="Google account"/>
<en title="Google Account"/>
</LCID>
</web>
```

The second example is similar to the first example, and the similar portions will not be described, wherein {LCID} represents that if a different language is encountered, then the {LCID} will be automatically filled according to the language value.

According to the above-mentioned biometrics data recognition apparatus, system and method, the user can utilize the biometrics data recognition device to perform the biometrics data recognition. After the verification pass is admitted, the account data and the password data are transferred to the computer device, which requests the login format data of the cloud server to make the computer device automatically log in the desired website, so that the convenience in use is enhanced.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A biometrics data recognition apparatus, comprising a biometrics data recognition device and a computer device, the biometrics data recognition device comprising:
    a biometrics data sensor capturing to-be-recognized biometrics data of an organism;
    a control processor electrically connected to the biometrics data sensor; and
    a storage, which is electrically connected to the control processor and stores template biometrics data and website login data corresponding to each other, wherein the control processor receives and judges whether the to-be-recognized biometrics data matches with the template biometrics data, and admits a verification pass and outputs the website login data to the computer device if the to-be-recognized biometrics data matches with the template biometrics data, wherein:
    the computer device communicates with a cloud server, extracts login format data from the cloud server according to the website login data, and combines the website login data with the login format data to make the computer device log in one or multiple websites corresponding to the website login data.

2. The apparatus according to claim 1, wherein after admitting the verification pass, the control processor further outputs an enable signal to the computer device to execute an application program of the computer device, and the computer device utilizes the application program to automatically log in the one or multiple websites.

3. The apparatus according to claim 1, wherein the control processor queries a user whether the user wants to log in the one or multiple websites before logging in the corresponding one or multiple websites.

4. The apparatus according to claim 1, wherein the biometrics data recognition device is connected to the computer device through a wireless network.

5. The apparatus according to claim 1, wherein the website login data comprises a website code, an account name and a password.

6. The apparatus according to claim 1, wherein the template biometrics data corresponds to biometrics data of multiple users, and the website login data comprises multiple website codes, multiple account names and multiple passwords corresponding to the biometrics data of the multiple users.

7. The apparatus according to claim 1, wherein the template biometrics data corresponds to biometrics data of different portions of a single user, and the website login data comprises multiple website codes, multiple account names and multiple passwords corresponding to the biometrics data of the different portions of the user.

8. The apparatus according to claim 1, wherein the computer device timely communicates with the cloud server to confirm whether the login format data is updated, and actively downloads an updated portion of the login format data if the login format data is updated.

9. A biometrics data recognition method, comprising the steps of:
    utilizing a biometrics data sensor to capture to-be-recognized biometrics data of an organism;
    utilizing a control processor to receive and judge whether the to-be-recognized biometrics data matches with template biometrics data stored in a storage, wherein if the to-be-recognized biometrics data matches with the template biometrics data, then, the control processor admits a verification pass and outputs corresponding website login data, stored in the storage, to a computer device;
    utilizing the computer device to communicate with a cloud server and extract login format data from the cloud server according to the website login data; and
    combining the website login data with the login format data to make the computer device log in one or multiple websites corresponding to the website login data.

10. The method according to claim 9, further comprising: after the control processor admits the verification pass, utilizing the control processor to output an enable signal to the computer device to execute an application program of the computer device, so that the computer device utilizes the application program to automatically log in the one or multiple websites.

11. The method according to claim 9, further comprising: before logging in the corresponding one or multiple websites, utilizing the control processor to query a user whether the user wants to log in the one or multiple websites.

12. The method according to claim 9, wherein the template biometrics data corresponds to biometrics data of multiple users, and the website login data comprises multiple website codes, multiple account names and multiple passwords corresponding to the biometrics data of the multiple users.

13. The method according to claim 9, wherein the template biometrics data corresponds to biometrics data of different portions of a single user, and the website login data comprises multiple website codes, multiple account names and multiple passwords corresponding to the biometrics data of the different portions of the user.

14. A non-transitory tangible computer readable medium storing a biometrics data recognition application program capable of executing a biometrics data recognition method, the biometrics data recognition method comprising the steps of:
- utilizing a biometrics data sensor of a biometrics data recognition device to capture to-be-recognized biometrics data of an organism;
- utilizing a control processor of the biometrics data recognition device to receive and judge whether the to-be-recognized biometrics data matches with template biometrics data, stored in a storage of the biometrics data recognition device, wherein if the to-be-recognized biometrics data matches with the template biometrics data, the control processor admits a verification pass and outputs corresponding website login data, stored in the storage, to a computer device;
- utilizing the computer device to communicate with a cloud server and extract login format data from the cloud server according to the website login data; and
- combining the website login data with the login format data to make the computer device log in one or multiple websites corresponding to the website login data.

* * * * *